United States Patent

[11] 3,633,552

[72] Inventor Ernest G. Huber
 3001 Veazey Terrace, N.W., Washington, D.C. 20008
[21] Appl. No. 862,223
[22] Filed Sept. 30, 1969
[45] Patented Jan. 11, 1972

[54] INTERNAL COMBUSTION ENGINE INCLUDING MAXIMUM FIRING PRESSURE-LIMITING MEANS
13 Claims, 6 Drawing Figs.

[52] U.S. Cl. ................................................. 123/48 R, 123/48 B, 123/78 F
[51] Int. Cl. ..................................................... F02b 75/04, F02b 75/36
[50] Field of Search ............................................ 123/48 B, 48 R, 78 F

[56] References Cited
UNITED STATES PATENTS

| | | | |
|---|---|---|---|
| 1,404,366 | 1/1922 | Halton | 123/48 B |
| 2,433,639 | 12/1947 | Woodruff et al. | 123/48 B |
| 2,500,823 | 3/1950 | Hickey | 123/48 B X |
| 2,589,958 | 3/1952 | Petit | 123/48 B |
| 2,670,724 | 3/1954 | Reggio | 123/48 B X |

FOREIGN PATENTS

| | | | |
|---|---|---|---|
| 173,252 | 12/1921 | Great Britain | 123/48 B |

Primary Examiner—Wendell E. Burns
Attorney—Craig, Antonelli and Hill

ABSTRACT: A variable compression ratio internal combustion engine wherein the engine crankshaft together with pistons and connecting rods are moved in such a way to increase or decrease the compression ratio (decrease or increase combustion chamber volume) during operation to thereby limit maximum firing pressure to a predetermined valve for all engine loadings. The crankshaft is suspended in bearings in support members extending transverse to the crankshaft. The support members are pivotally supported at one end in the engine frame and individually suspended at the opposite end from an auxiliary crankshaft or the like.

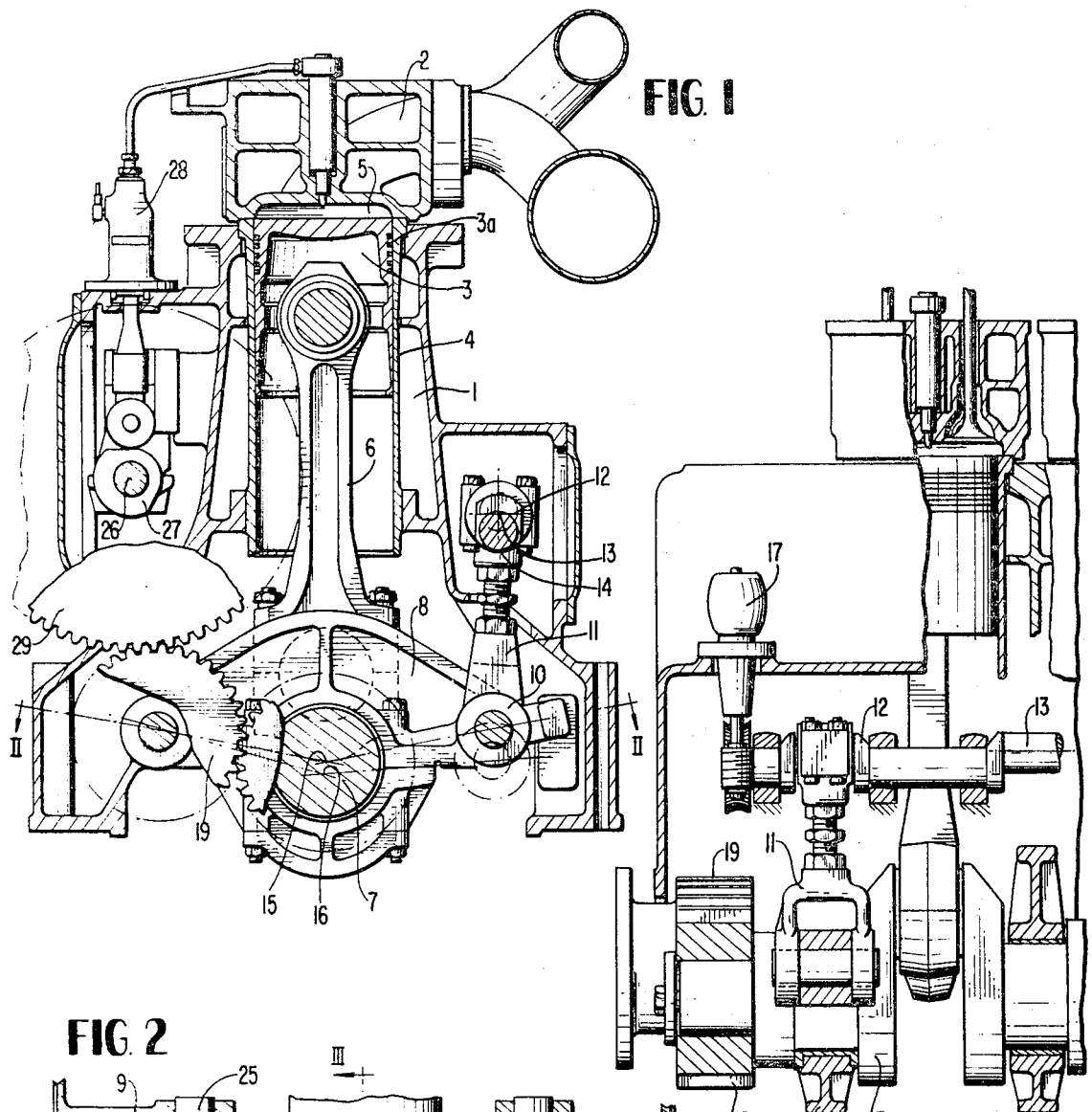
FIG. 1
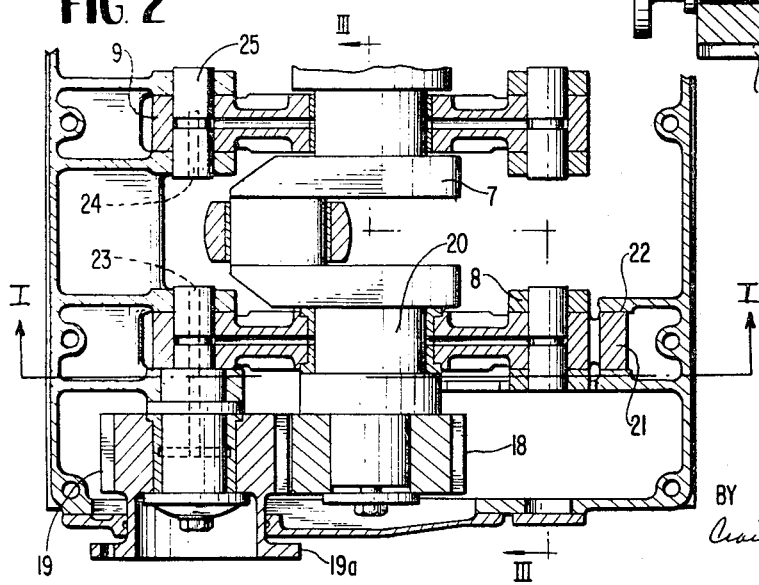
FIG. 2
FIG. 3
INVENTOR
ERNEST G. HUBER
BY Craig, Antonelli, Stewart & Hill
ATTORNEYS

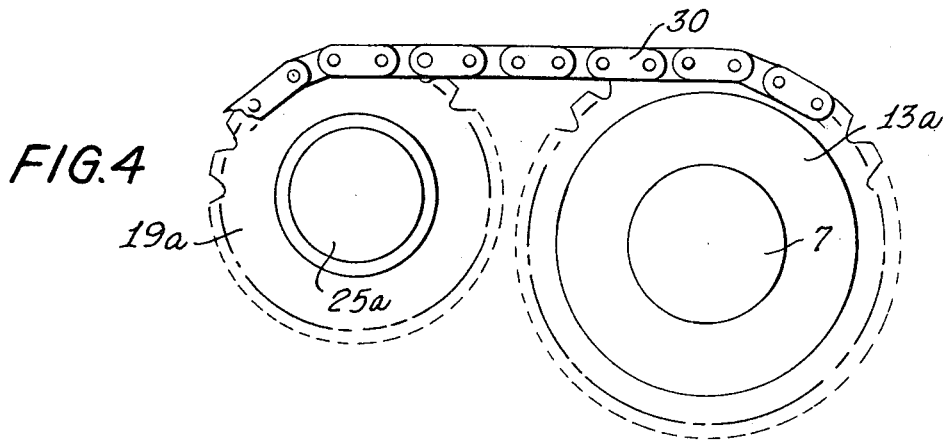
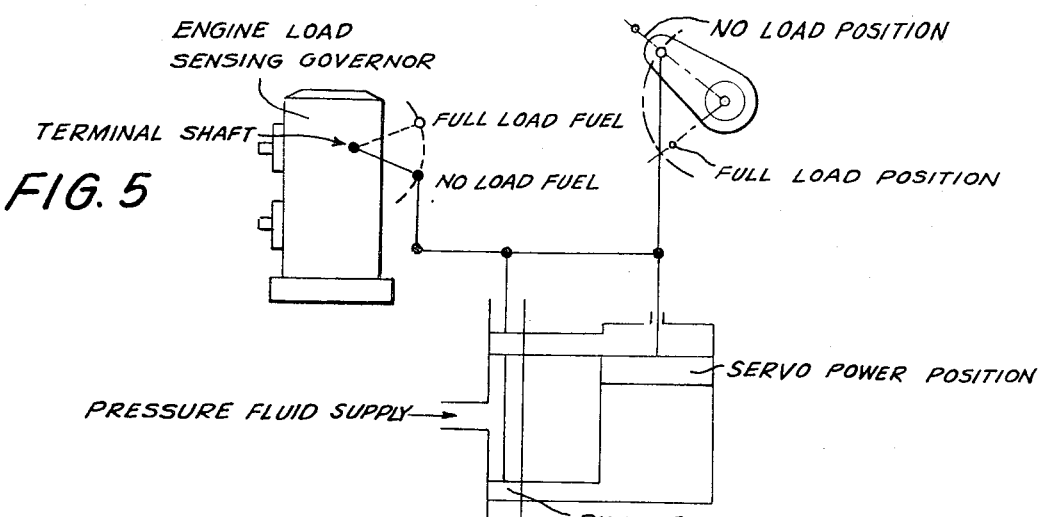
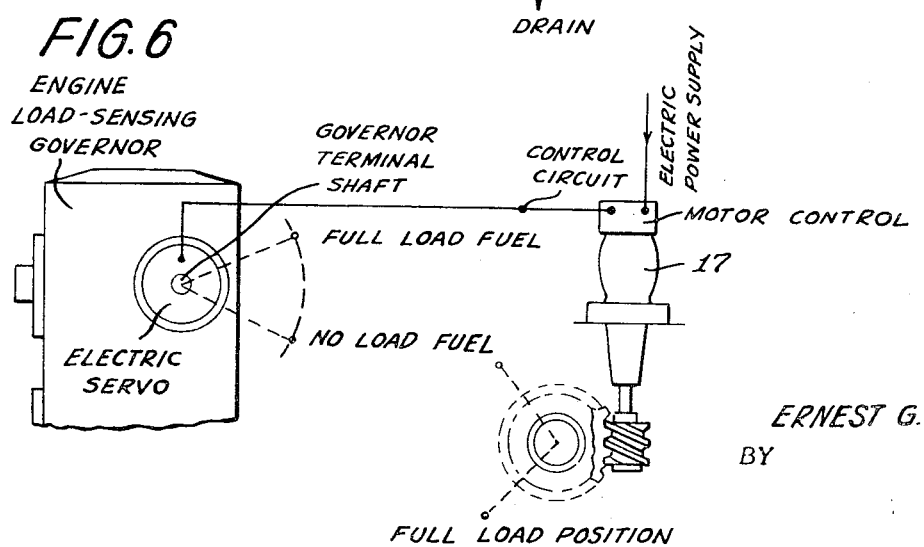

INTERNAL COMBUSTION ENGINE INCLUDING MAXIMUM FIRING PRESSURE-LIMITING MEANS

The present invention relates to supercharged (turbocharged) internal combustion engines including means for varying the cylinder compression ratio during operation to thereby limit the maximum firing pressure encountered as engine loading is increased. The term "compression ratio" as referred to for internal combustion engines is actually a cylinder volume ratio expressed as: piston displacement volume plus combustion chamber volume divided by the combustion chamber volume. The trend in the development of reciprocating engines is to increase the power output without increasing the size and weight of the prime mover. Power output of a given engine may be increased by either increasing the break mean effective pressure (BMEP) or by increasing the rotative speed or by a combination of the two. However, the BMEP of a supercharged engine can be increased only when the quantity of air, retained in the engine cylinders in support of combustion, is increased correspondingly. This can be accomplished by an increase in the supercharging pressure. Higher charging pressure, in turn, results in a higher compression end pressure. When the pressure rise due to combustion of a larger quantity of fuel (increased loading) is added to the already high-compression end pressure, the maximum firing pressure becomes extremely high. Presently accepted BMEPS for four-cycle turbocharged engines range from 160 p.s.i. to 220 p.s.i. Indications are that engines with BMEPS of 400 p.s.i. and higher will be developed in the future.

It is a well-known fact that the magnitude of the firing pressure occurring in the engine cylinders determines the structural strength and therefore the weight of engine components such as pistons, connecting rods, crankshaft, bearing surfaces and the general engine structure. Therefore, unless firing pressures can be limited according to the present invention, the success in building high specific-output engines remains limited.

On the other hand, if it is contemplated to increase the power output of an engine by an increase in the rotative speed thereof, it is essential that the weight of the rotating and reciprocating parts be kept to an absolute minimum in order to avoid the necessity for elaborate and heavy balancing means. Since the weight (mass) of these parts depends on the maximum cylinder firing pressures as explained above, the success for increasing the rotative speed to obtain more power without limiting firing pressures according to the present invention, will be limited.

Means have already been proposed to limit peak firing pressures through the use of variable compression ratio pistons. In such arrangements the height of the piston is adjusted by oil pressure in cavity between the piston crown and piston main body. This pressure is adjusted to balance the permitted maximum firing pressure. Obviously, such an arrangement has a number of disadvantages in that it is difficult to accurately control the oil pressure in the reciprocating piston cavity, to effectively seal the relatively high pressure between the components forming the cavity and, above all, the weight and the cost of the piston assembly is considerably increased.

The present invention avoids drawbacks of known devices by providing means for moving the engine crankshaft together with pistons and connecting rods in such a way as to increase or decrease the compression ratio (decrease or increase the combustion chamber volume) during operation to thereby limit the maximum cylinder firing pressure to a predetermined value for all engine loadings. This is accomplished by rotatably suspending the engine crankshaft in bearings located in transverse support members extending transversely to the centerline of the crankshaft between each two cylinders and terminating within the engine frame. The transverse support members are each pivotably supported at one end thereof in the engine frame and individually pivotably suspended at the opposite end thereof from an auxiliary crankshaft or the like located within the engine structure. Suspension of each opposite end of the transverse members is accomplished by individual link members the length of which is adjustable. This mode of suspension provides for individually adjusting the elevation of the crankshaft bearing bores in relation to each other to thereby obtain perfect alignment of the bearing bores and also position the crankshaft assembly so that its centerline will be perpendicular to the centerline of the cylinder bores. Through rotation of the auxiliary crankshaft, the transverse support members including engine crankshaft assembly, may be rotated in unison about the pivot support of the transverse members to thereby increase or decrease the combustion chamber volume formed between each piston top and corresponding underside of the cylinder head which results in decreasing and increasing of the cylinder compression ratio. Power takeoff from the engine is accomplished by a drive gear mounted on the engine crankshaft engaging a driven or power output gear rotatably mounted in the engine frame with the center of rotation coinciding with the pivot center of the transverse support members. As an alternate, the drive gear and the power takeoff gear could, for example, be replaced by chain sprockets and the power transferred from one to the other by a chain drive. The power output gear is provided with conventional flange means for driving any type of industrial machines.

A feature according to the present invention is the ability to vary the compression ratio of a supercharged internal combustion engine during operation to thereby limit the cylinder peak firing a pressure to a desired maximum as engine loading is increased.

Another feature according to the present invention is that, as a result of limiting cylinder peak firing pressures at increased engine loading, the structural strength, and therefore the weight of the reciprocating parts such as pistons and connecting rods, may be held to a minimum.

A further feature in limiting cylinder peak firing pressures of an internal combustion engine according to the present invention lies therein, that the strength and therefore the weight of the general engine structure such as cylinder liners, cylinder block, cylinder heads and crankshaft may be held to a minimum.

As a result of maintaining the structural strength of the internal parts to a minimum, according to the present invention, cooling thereof remains effective at all loads due to the wall thickness of these parts through which heat must travel to the cooling fluid, is also held to a minimum.

Still another feature in limiting peak firing pressures according to the present invention lies therein, that the engine bearing surfaces and therefore the size of main and connecting rod bearings may be held to a minimum regardless of engine loading.

A further feature in limiting the maximum cylinder firing pressures according to the present invention lies therein that piston ring wear and the number of piston rings can be held to a minimum regardless of engine power output to thereby reduce loss of power due to ring friction.

Another feature derived through the means for varying the compression ratio according to the present invention lies therein that as this ratio is decreased at increased engine loading, the cylinder volume at the beginning of the compression stroke is increased to thereby provide a larger quantity of air in support of combustion.

Still another feature resulting from the means for varying the compression ratio according to the present invention lies therein that alignment of the crankshaft bearings and crankshaft assembly is facilitated by simple adjustment of the position of the individual transverse support members in relation to each other and as a group.

Yet another advantage derived by the mode of suspension of the crankshaft, according to the present invention, lies therein, that the rotative speed of the power takeoff shaft is not limited to the engine speed but may be varied by a change of the gear ratio of crankshaft drive gear and power output or driven gear means.

Another feature resides therein, that the method for limiting peak firing pressures according to the present invention is applicable to engines having any number of cylinders arranged in line or forming a Vee.

Further objects and features of the invention will become apparent from the following description of an embodiment of the invention which is given by way of example and is described with reference to the accompanying drawings in which:

FIG. 1 shows a vertical cross section through an internal combustion engine along line 1—1 of FIG. 2 incorporating means for varying the compression ratio to thereby limit cylinder firing peak pressures according to the present invention.

FIG. 2 shows a horizontal sectional view taken along lines 11—11 of FIG. 1.

FIG. 3 is a partial longitudinal view taken along line 111—111 of FIG. 2.

FIG. 4 shows chain drive means for transferring power from the main crankshaft to the power takeoff means.

FIG. 5 illustrates schematically hydraulic servo mechanism means for rotating and positioning the auxiliary crankshaft during engine operation in dependence of engine loading.

FIG. 6 illustrates schematically servoelectrical means for rotating and positioning the auxiliary crankshaft in dependence of engine loading.

The drawings show an internal combustion engine consisting of an engine frame 1, cylinder heads 2, pistons 3 including piston rings 3a, slidably arranged in cylinder 4 and forming combustion chambers 5 between the top of the pistons 3 and respective underside of the cylinder heads 2, connecting rods 6 operatively connected to respective pistons and a main crankshaft 7. According to the present invention, the main crankshaft 7 is rotatably suspended in conventional bearings arranged in individual transverse support members 8 and extending transversely to the centerline of the crankshaft between each two cylinders and terminating within the engine frame 1. The transverse support members 8 are each pivotably supported at one end 9 thereof by pivot pins 25 (FIG. 2) arranged in the engine frame 1 and individually pivotably suspended at the opposite end 10 thereof from an auxiliary crankshaft 12 or the like located within the engine frame 1. Suspension of each said opposite ends 10 of the transverse members 8 is accomplished by links 11, the length of which is adjustable by adjusting means 11A as shown, or similar conventional means. Through rotation of the auxiliary crankshaft 12 from the crank top position 13 (FIG. 1) to the bottom position 14, the transverse support members 8 together with crankshaft 7, connecting rods 6 and pistons 3 may be rotated about the axis of pivot pin 25 to thereby move the center of the main crankshaft 7 from position 15 to 16 thereby correspondingly enlarging the volume of the combustion chambers 5 and therewith effecting a decrease of the compression or volume ratio of the engine. Cooling of the cylinders 4 and cylinder heads 2 is accomplished in a conventional manner by cooling fluid circulating around the outside of cylinders 4 and passing through cooling passages in the cylinder heads 2.

Rotation of the auxiliary crankshaft 12 may be accomplished during engine operation by conventional drive means 17 with the angle of rotation being dependent on engine load. For example, the drive means 17 may consist of a reversible hydraulic, pneumatic or electric motor operatively connected to the auxiliary crankshaft 12 by means of a conventional worm gear drive or the like. Operation of the drive means and angular positioning of the auxiliary crankshaft may be controlled, for example, through the motion produced by the engine load-sensing governor for adjusting fuel delivery in accordance with engine load together with conventional servomechanism means illustrated schematically in FIGS. 5 and 6. By relating the angle of rotation of the auxiliary crankshaft 12 to engine load, the maximum firing pressure may be limited to the desired value over the entire load range.

Power takeoff for the internal combustion engine, according to the present invention, is illustrated in FIG. 2 and consists of a gear pinion 18 mounted on the main crankshaft 7, engaging a driven or power output gear 19 rotatably mounted on a shaft 25a supported in frame 1 and extending substantially coaxially with the axis of the pivot pins 25 for the transverse support members 8. If a rotative speed of the power output gear other than the rotative speed of the engine is desired, the gear ratio between gears 18 and 19 may be changed accordingly. The power output gear 19 is provided with a power takeoff flange means 19a or the like for driving an electric generator, pumps, compressors, propeller shaft or other industrial machines. As an alternate, power transfer from the main crankshaft 7 to the power takeoff means according to the present invention could, for example, be accomplished by means of a suitable chain drive as illustrated in FIG. 4. The drive sprocket 13a is mounted on the main crankshaft 7 and is operatively connected by chain 30 to a power output sprocket 19a rotatably mounted on shaft 25a supported in frame 1 and extending substantially coaxially with the axis of the pivot pins 25.

Fuel injection into the engine cylinders is accomplished by conventional means including a camshaft 26 (FIG. 1) provided with cams 27 for actuating the fuel injection pumps 28. Camshaft 26 is provided with a gear 29 being driven in a conventional manner either directly or through intermediate gears from the power output gear 19. When the crankshaft assembly 7, is moved between positions 15 and 16, according to the present invention, the angular position of the camshaft relative to the angular position of the crankshaft is changed accordingly whereby the beginning of fuel injection into the combustion chamber 5 relative to the top dead-center position of pistons 3 is also changed (advanced or retarded). Advancing fuel injection timing is especially desired for variable-speed engines to compensate, at higher engine speed, for the time-constant fuel ignition delay period and thereby avoid late combustion. As an alternate, the above-described camshaft drive means could be replaced by a conventional chain drive arrangement.

In order to prevent longitudinal movement of the main crankshaft 7, one of the transverse support members 8 is provided with a thrust bearing 20 and a guide lug 21 extending from the free end of the transverse member which, in turn, is guided in guide shoes 22 arranged in the engine frame 1 and adjustable in the direction of the crankshaft axis.

Oil for lubrication and piston cooling is supplied from an engine lube oil heater (not shown) to openings 23 and 24 arranged in the transverse support member pivot pins 25. From here the oil passes in a conventional manner in sequence to the main crankshaft bearings, through passages in the crankshaft to the connecting rod bearings, through a passage in the connecting rods to the wrist pin bearings and to the underside of the pistons for cooling same.

I claim:

1. A supercharged internal combustion engine including an engine frame, cylinders, at least one cylinder head for the cylinders, pistons slidingly arranged in the cylinders and forming a combustion chamber between a piston and the corresponding underside of the cylinder head, and a connecting rod connecting a piston to a crankshaft, characterized by means for varying the volume of said combustion chamber during engine operation by changing the position of the crankshaft axis relative to the underside of the cylinder head including a plurality of individual transverse support members rotatably supporting said crankshaft in bearings and extending substantially transversely to the longitudinal centerline of said crankshaft, first support means pivotally supporting each support member at one end thereof in the engine frame about a pivot axis, and second support means individually suspending each support member at the opposite end thereof in the engine frame, said second support means including an auxiliary crankshaft rotatably supported in said frame and having portions located eccentrically to the centerline of rotation, and individual link members each pivotably connecting one of said opposite ends with one of said eccentric portions of said auxiliary shaft, the length of said link members being adjustable for individually adjusting the elevation of each crankshaft bearing in said transverse members in relation to each other to achieve accurate bearing alignment, a level position of the crankshaft assembly and equalization of bearing loading, and means for rotating said auxiliary shaft to effect rotation in unison of said opposite ends of said transverse support members about said pivot axis.

2. An internal combustion engine according to claim 1 wherein the angle of rotation of said auxiliary shaft is dependent on the loading of the engine.

3. An internal combustion engine according to claim 2, further comprising means for preventing said crankshaft from moving in a longitudinal direction including a crankshaft thrust bearing arranged in one of said transverse support members, said one transverse support member being provided with a guide lug at said opposite end thereof, and said frame being provided with adjustable guide faces for guiding said lug to thereby maintain the crankshaft in a fixed longitudinal position relative to the centerlines of said cylinders.

4. A supercharged internal combustion engine including an engine frame, cylinders, at least one cylinder head for the cylinders, pistons slidingly arranged in the cylinders and forming a combustion chamber between a piston and the corresponding underside of the cylinder head, and a connecting rod connecting a piston to the main crankshaft, characterized by means for varying the volume of said combustion chamber during engine operation by changing the position of the crankshaft axis relative to the underside of the cylinder head including a plurality of individual transverse support members provided between each two cylinders rotatably supporting said main crankshaft in bearings and extending substantially transversely to the longitudinal centerline of said crankshaft, first support means pivotally supporting each support member at one end thereof in the engine frame about a pivot axis, second support means individually suspending said support member at the opposite end thereof, an auxiliary crankshaft rotatably supported in said frame having portions located eccentrically to the centerline of rotation, individual link members each pivotally connecting one of said opposite ends with one of said eccentric portions of said auxiliary crankshaft, the length of a link member being adjustable for individually adjusting the elevation of each opposite end and the center of the main crankshaft bearing in relation to each other to achieve accurate bearing alignment, a level position of the main crankshaft assembly and equalization of bearing loading, shaft means fixed in said engine frame extending substantially coaxial with said pivot axis, power output gear means rotatably mounted on said shaft means and operatively engaging drive gear means mounted on said main crankshaft forming connecting means drivingly connecting the main crankshaft with the power output gear.

5. An internal combustion engine according to claim 4, wherein said power output gear means is provided with power takeoff flange means.

6. An internal combustion engine according to claim 4, wherein the gear ratio between said drive gear means and said power output gear means may be varied to thereby effect a speed increase or decrease of the power output gear in relation to the crankshaft rotative speed.

7. An internal combustion engine according to claim 4, wherein said drive gear means and said power output gear means form chain sprocket means including chain drive means for the transfer of power from one to the other.

8. An internal combustion engine according to claim 4, wherein said engine is provided with fuel injection pump means, a camshaft rotatably arranged in said frame including cam means for actuating said injection pump means, gear means mounted on said camshaft engaging with said power output gear means whereby the start of injection in relation to the top dead-center position of said piston is advanced and/or retarded when the position of said main crankshaft is changed in relation to the underside of said cylinder head.

9. An internal combustion engine according to claim 4, wherein said means for varying the volume of said combustion chamber inclusive said connecting means is accommodated substantially completely within the engine frame.

10. An internal combustion engine according to claim 4, wherein means are provided for rotating said auxiliary crankshaft to effect rotation in unison of said opposite ends of said transverse support members about said pivot axis.

11. An internal combustion engine according to claim 10, wherein the angle of rotation of said auxiliary crankshaft is dependent on the power output of the engine.

12. An internal combustion engine according to claim 4, further comprising means for preventing said crankshaft from moving in a longitudinal direction, said last-mentioned means consisting of a crankshaft thrust bearing arranged in one of said transverse support members, said one transverse support member being provided with a guide lug at said opposite end thereof, and said frame being provided with adjustable guide faces for guiding said lug to thereby maintain the crankshaft in a fixed longitudinal position relative to the centerlines of said cylinders.

13. A supercharged multicylinder internal combustion engine which includes an engine frame, a plurality of cylinders, at least one cylinder head for the cylinders, pistons slidingly arranged in the cylinders and forming a combustion chamber between a piston and the corresponding underside of the cylinder head, and a connecting rod connecting a piston to the crankshaft, means for varying the volume of said combustion chamber during operation by changing the position of the crankshaft axis relative to the underside of the cylinder head and means for supercharging the engine, characterized in that the means for varying the volume of said combustion chamber includes a plurality of individual transverse support members rotatably supporting said crankshaft in bearings and extending substantially transversely to the longitudinal center line of said crankshaft, first support means pivotally supporting each support member at one end thereof in the engine frame about a pivot axis, and second support means suspending each support member at the opposite end thereof in the engine frame in an individually adjustable manner, and means for controlling said means for varying the volume of said combustion chamber in such a manner that the combustion chamber volume is increased with an engine load increase to thereby limit the end compression pressure and therewith the firing pressure of the engine.

* * * * *